United States Patent Office 3,080,356
Patented Mar. 5, 1963

3,080,356
PROCESS FOR THE PRODUCTION OF SYNTHETIC PENICILLINS
Eric Robert Catlin, Betchworth, and Minoo Dossabhoy Mehta, Kensington, London, England, assignors to Beecham Research Laboratories Limited, Middlesex, England, a British company
No Drawing. Filed Sept. 20, 1960, Ser. No. 57,142
Claims priority, application Great Britain June 15, 1960
5 Claims. (Cl. 260—239.1)

This invention relates to the production of penicillins and is particularly concerned with processes for the preparation of α-amino-substituted penicillins.

In copending applications there are described and claimed the preparation of α-amino-substituted penicillins by the reaction of 6-aminopenicillanic acid with the mixed anhydride of an α-carbobenzyloxyamino-substituted carboxylic acid and an alkyl chloroformate followed by the hydrogenolytic removal of the carbobenzyloxy grouping from the resulting penicillins. These penicillins included α-aminopentylpenicillin, α-aminoheptylpenicillin, α-aminocyclohexylmethylpenicillin, α-amino - β - phenylethylpenicillin, α-amino-β-3-indolylethylpenicillin, α-aminobenzylpenicillin, α-amino-p-methoxybenzylpenicillin, α-amino-p-chlorobenzylpenicillin, α-amino- 1 -naphthylmethylpenicillin, and α-amino-2-furylmethylpenicillin. It is understood that reference to these penicillins is intended to include both their free acid form and their salts, including metallic salts such as sodium, potassium, calcium, and aluminum, the ammonium salt and substituted ammonium salts such as salts of trialkylamines, including triethylamine, procaine, dibenzylamine, N-benzyl-beta-phenethylamine, 1-ephenamine, N,N'-dibenzylethylenediamine, dehydroabietylamine, N,N'-bis - dehydroabietylethylenediamine, N-(lower)alkalpiperidines, e.g. N-ethylpiperidine, and other amines which have been used to form salts with benzylpenicillin. Also included are easily hydrolyzed esters which are converted to the free acid form by chemical or enzymatic hydrolysis.

This prior process has a number of disadvantages, including the fact that the mixed anhydride is difficult to prepare and that the hydrogenation step requires the use of large amounts of an expensive rare metal catalyst.

It is the object of the present invention to provide a process for the preparation of these penicillins which overcomes the above mentioned disadvantages.

Accordingly, the present invention provides a process for the preparation of penicillins of the general formula:

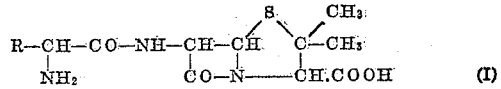   (I)

and nontoxic salts thereof, where R is a hydrogen atom or an alkyl, aryl, aralkyl or heterocyclic group which may also be substituted, which process comprises reacting 6-aminopenicillanic acid, preferably in the form of a neutral salt, with an internal N-carboxy or N-thiocarboxy anhydride in the presence of a basic condensing agent.

Thus in Formula I above, R represents hydrogen, alkyl, preferably (lower)alkyl, aralkyl [i.e., phenyl(lower)-alkyl, including benzyl, α- and β-phenethyl, and α- and β- and γ-phenylpropyl, etc. and the same groups substituted once or twice with halogen, alkoxy, phenoxy, or alkyl], heterocyclic groups such as 3-indolylmethyl, 2-thienyl and 2-furyl [all of which may be substituted in the manner set forth above for aralkyl], 1-naphthyl, 2-naphthyl and phenyl [all three of which may be substituted in the manner set forth above for aralkyl]. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. In the preferred embodiment, R is phenyl.

The neutral salts of 6-aminopenicillanic acid includes those with metals and with tertiary hydrocarbonyl amines, e.g., N-ethyl-piperidine or tertiary aliphatic amines such as triethylamine. Tertiary hydrocarbonyl amines are compounds having the formula

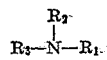

wherein the R groups contain only the elements carbon and hydrogen and include compounds such as pyridine and N-ethylpiperidine as well as compounds such as trialkylamines and dimethylaniline.

The present invention thus includes within its scope a process for the preparation of a compound selected from the group consisting of a penicillin and salts thereof, said penicillin having the formula

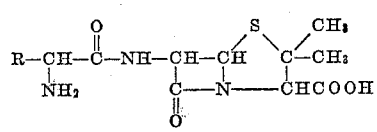

wherein R is a member selected from the group consisting of hydrogen, (lower)alkyl, phenyl, halophenyl, (lower)-alkoxyphenyl, phenoxyphenyl, benzyloxyphenyl, trifluoromethylphenyl, nitrophenyl, acylaminophenyl, (lower)-alkylphenyl, phenyl(lower)alkyl, halophenyl(lower)alkyl, (lower)alkoxyphenyl(lower)alkyl, phenoxyphenyl(lower)alkyl, benzyloxyphenyl(lower)alkyl, trifluoromethylphenyl(lower)alkyl, nitrophenyl(lower)alkyl, acylaminophenyl (lower) alkyl, (lower) alkylphenyl (lower) alkyl, naphthyl, halonaphthyl, (lower)alkoxynaphthyl, phenoxynaphthyl, benzyloxynaphthyl, trifluoromethylnaphthyl, nitronaphthyl, acylaminonaphthyl, (lower)alkylnaphthyl, 3-indolylmethyl, thienyl and furyl which comprises mixing at least one stoichiometric equivalent of a member selected from the group consisting of 6-aminopenicillanic acid and neutral salts thereof with a compound having the formula

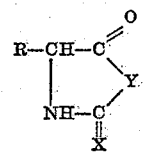

wherein R has the meaning set forth above and wherein X and Y are each members selected from the group consisting of oxygen and sulfur and at least one is oxygen and a tertiary hydrocarbonyl amine in a substantially anhydrous inert solvent below about 40° C. for at least thirty minutes and then recovering said compound.

A preferred embodiment of the present invention is a process for the preparation of a compound selected from the group consisting of a penicillin and salts thereof, said penicillin having the formula

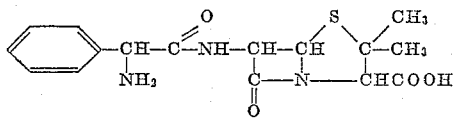

which comprises mixing at least one stoichiometric equivalent of a member selected from the group consisting of 6-aminopenicillanic acid and neutral salts thereof with a compound having the formula

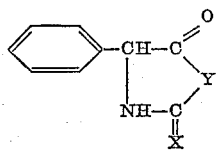

wherein X and Y are each members selected from the group consisting of oxygen and sulfur and at least one is oxygen and a tertiary hydrocarbonyl amine in a substantially anhydrous inert solvent and then recovering said compound.

The basic condensing agent acts as an acid acceptor and the reaction can be illustrated as follows:

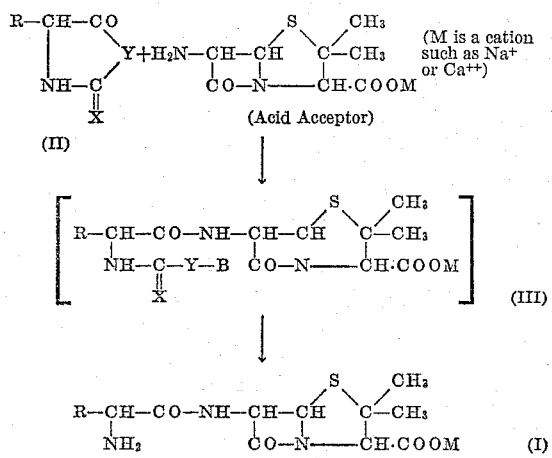

In the anhydride (II) X and Y may be oxygen or sulfur; in the form of the present invention in which both X and Y are oxygen the compounds are known as Leuchs anhydrides.

The intermediate penicillin (III) formed during the reaction decomposes spontaneously, or by treatment with an acid, to the desired penicillin (I). The intermediate penicillin (III) is not isolated and in many cases has only a transient existence.

The preferred acid acceptor is 2:6-lutidine but any tertiary hydrocarbonyl amine, e.g. triethylamine, pyridine or the picolines, may be used.

The Leuchs anhydrides are extremely unstable compounds and when using these compounds it is essential to use nonaqueous solvents, e.g. dimethylformamide, methylenechloride, and to carry out the reaction at a low temperature, e.g. −30 to −50° C. It is preferred to use the calcium salt of 6-aminopenicillanic acid in this reaction as it is more soluble in dimethylformamide than are the other salts of 6-aminopenicillanic acid.

In an alternative form of the present invention the monothio analogues of the Leuchs anhydrides are employed. The structure of these compounds is uncertain and is either

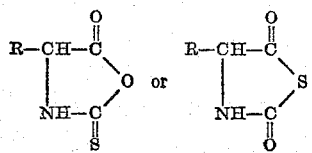

An advantage of the use of the monothio analogues is that being more stable to water and to bases than the Leuchs anhydrides they will react with a neutral salt of 6-aminopenicillanic acid, e.g. the sodium salt, in aqueous acetone solutions at room temperature, i.e. below about 40° C.

The compounds formed by the process of the present invention are of value as antibacterial agents, as nutritional supplements in animal feeds, as agents for the treatment of mastitis in cattle, as therapeutic agents in poultry and animals, including man, in the treatment especially of infectious diseases caused by Gram-positive and Gram-negative bacteria and as agents for the sterilization of typhoid carriers.

The penicillins of the present invention exist in epimeric forms and it will be understood that the invention includes such forms.

At the conclusion of the reaction, the products are isolated by lyophilisation. In those cases where Leuchs anhydrides have been used, the product obtained after lyophilisation is digested with water and filtered to remove polymeric impurities and the filtrate is then once again evaporated to dryness in vacuo (bath temperature 30°).

If necessary, the products obtained after lyophilisation may be redissolved in water, acidified to pH 2, the insoluble impurities removed by filtration and the filtrate adjusted to pH 7 using aqueous sodium bicarbonate solution. The resulting solution is then evaporated to dryness in vacuo (bath temperature 30°). Dilute sulfuric acid (1 N) was used for the acidification when calcium 6-aminopenicillanate was used and dilute hydrochloric acid (1 N) was employed in the case of sodium 6-aminopenicillanate.

As a final purification process the lyophilised material may be absorbed on and eluted from an anion exchange resin following the procedure of Belgian Patent 569,728 for the purification of 6-aminopenicillanic acid.

6-aminopenicillanic acid is prepared according to Batchelor et al. (Nature 183, 257, 258, January 24, 1959) or Belgian Patent 569,728.

The following examples illustrate the invention:

EXAMPLE I

*Preparation of α-Aminobenzylpenicillin*

A solution of 4-phenyloxazolid-2:5-dione (0.44 g.) in dry dimethylformamide (8 ml.) was cooled to −30° C. and added during 5 mins., to a well-stirred solution of the calcium salt of 6-aminopenicillanic acid (0.8 g., prepared by adding calcium carbonate to a suspension of 6-aminopenicillanic acid in water) in dimethylformamide (25 ml.) and 2:6-lutidine (0.3 g.) also cooled to −30° C. The stirring was continued at this temperature for 5 hrs. The resulting clear solution was allowed to warm up to room temperature, water (10 ml.) added and stirred for a further 15 mins., at room temperature. The solution was evaporated to dryness in vacuo (bath temperature 30° C.) and the residual solid triturated with dry ether to give the crude calcium salt of α-aminobenzylpenicillin (0.64 g., 51%). In order to remove some insoluble polymeric impurities, it was redissolved in water, filtered and the aqueous solution once again evaporated to dryness in vacuo (bath temperature 30° C.). Paper chromatography showed that the amount of this penicillin relative to unreacted 6-aminopenicillanic acid was approximately in the ratio of 5:1.

4-phenyloxazolid-2:5-dione (65%) was prepared by cyclisation of N-carbobenzyloxy-DL-α-aminophenylacetic acid in the presence of acetic anhydride and thionyl chloride as described by Farthing (J. Chem. Soc., London, 1950, 3213) and was obtained as pale yellow microprisms, M.P. 94° C. (decomp.). Leuchs and Geiger (Ber., 1908, 41, 1722) quote M.P. 100° C. (decomp.).

EXAMPLE 2

Preparation of α-Aminobenzylpenicillin

A solution of 4-phenylthiazolid-2:5-dione (7.9 g.) in acetone (190 ml.) was added dropwise during 1 hour to a well-stirred solution of the sodium salt of 6-aminopenicillanic acid (10 g.) and 2:6-lutidine (4.4 g.) in water (170 ml.) at 0° C. During the adition, a precipitate was observed to separate and after the addition was complete, the reaction mixture was stirred for 0.5 hour at 0° C. The cooling bath was removed and the contents allowed to warm to room temperature when a homogenous solution resulted. The stirring was then continued for 3 hours at room temperature. At the end of this period, acetone was removed under reduced pressure (bath temperature not greater than 30° C.) and final evaporation of the aqueous solution in vacuo (bath temperature 30° C.) gave a gummy solid. This was dried in vacuo (1 mm.) and triturated with dry ether to give the crude sodium salt of α-aminobenzylpenicillin (14.8 g.).

The 4-phenylthiazolid-2:5-dione required for the above reaction was prepared by two routes:

(a) Cyclisation of N-(thiocarbethoxy)-DL-α-aminophenylacetic acid (24 g.) in dry benzene (150 ml.) in the presence of phosphorus trichloride (18 ml.) by analogy with Aubert et al. (J. Chem. Soc., London, 1951, 2195) gave colourless needles of 4-phenylthiazolid-2:5-dione (14 g.) M.P. 132° C., after crystallisation from chloroform/light petroleum (40–60° C.). (Found: C, 55.3; H, 4.0; N, 7.3; S, 16.4. $C_9H_7O_2NS$ requires C, 56.0; H, 3.6; N, 7.3; S, 16.6%.)

The N-thiocarbethoxy compound was prepared by reaction of DL-α-aminophenylacetic acid (40 g.) with ethyl ethoxydithioformate (40 g.) in boiling aqueous ethanolic potassium hydroxide solution for 18 hours as described by Aubert et al. (loc. cit.) to give N-(thiocarbethoxy)-DL-α-aminophenylacetic acid (44 g., 70%) as colourless microprisms, M.P. 107° C., on crystallisation from light petroleum (B.P. 40–60° C.)/chloroform. (Found: C, 54.5; H, 5.3; N, 5.6; S, 13.0. $C_{11}H_{13}O_3NS$ requires C, 55.2; H, 5.4; N, 5.9; S, 13.4%.)

Ethyl ethoxydithioformate was prepared by reacting potassium ethyl xanthate with ethyl bromide as described by Aubert et al., (loc. cit.) and was used without further purification.

(b) Solutions of 10% aqueous sodium hydroxide (29 ml.) and of ethyl chlorothioformate (9.1 g.) in dry toluene (6 ml.) were simultaneously added to a well-stirred solution of DL-α-aminophenylacetic acid (11 g.) in 10% aqueous sodium hydroxide (29 ml.) at 0° C. during 15 mins. When the addition was complete, the reaction mixture was stirred for 1.5 hours at room temperature. The whole was then added with stirring to excess 5 N-hydrochloric acid and the crude reaction product was purified by treatment with aqueous sodium bicarbonate solution followed by acidification to yield N-(thiocarbethoxy)-DL-α-aminophenylacetic acid (10.4 g., 60%) M.P. and mixed M.P. 107° C., as colourless microprisms on crystallisation from light petroleum (B.P. 40–60° C.)/chloroform.

Ethyl chlorothioformate was obtained in 53% yield as a pale yellow lachrymatory liquid, B.P. 55–57° C./18 mm., by the reaction of sodium ethoxide with thiophosgene in dry benzene according to the procedure described by Rivier and Richard (Helv. chim. Acta., 1925, 8, 490).

Aditional information on N-carboxy-α-amino acid anhydrides with regard to their preparation and reactions is to be found on pages 136–160 of Advances in Protein Chemistry, vol. VI, 1951, Academic Press, Inc., New York, N.Y., and in the references cited therein.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:

1. A process for the preparation of a penicillin, said penicillin having the formula

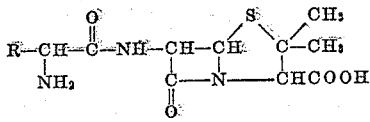

wherein R is a member selected from the group consisting of hydrogen, (lower)alkyl, phenyl, halophenyl, (lower)alkoxyphenyl, phenoxyphenyl, benzyloxyphenyl, trifluoromethylphenyl, nitrophenyl, (lower)alkanoylaminophenyl, (lower)alkylphenyl, phenyl(lower)alkyl, halophenyl(lower)alkyl, (lower) alkoxyphenyl (lower) alkyl, phenoxyphenyl(lower)alkyl, benzyloxyphenyl(lower)alkyl, trifluoromethylphenyl(lower)alkyl, nitrophenyl(lower)alkyl, (lower)alkanoylaminophenyl(lower)alkyl, (lower) alkylphenyl (lower) alkyl, naphthyl, halonaphthyl, (lower)alkoxynaphthyl, phenoxynaphthyl, benzyloxynaphthyl, trifluoromethylnaphthyl, nitronaphthyl, (lower) alkanoylaminonaphthyl, (lower) alkylnaphthyl, indolylmethyl, thienyl and furyl which comprises mixing a member selected from the group consisting of 6-aminopenicillanic acid and neutral salts thereof with a compound having the formula

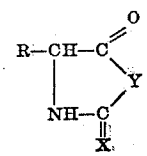

wherein R has the meaning set forth above and wherein X and Y are each members selected from the group consisting of oxygen and sulfur and at least one is oxygen and a basic condensing agent in a substantially anhydrous inert solvent.

2. A process for the preparation of a penicillin, said penicillin having the formula

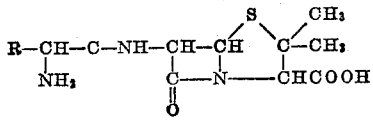

wherein R is a member selected from the group consisting of hydrogen, (lower)alkyl, phenyl, halophenyl, (lower)-alkoxyphenyl, phenoxyphenyl, benzyloxyphenyl, trifluoromethylphenyl, nitrophenyl, (lower alkanoylaminophenyl, (lower)alkylphenyl, phenyl(lower)alkyl, halophenyl(lower)alkyl, (lower)alkoxyphenyl(lower)alkyl, phenoxyphenyl(lower)alkyl, benzyloxyphenyl(lower)alkyl, trifluoromethylphenyl (lower) alkyl, nitrophenyl(lower)alkyl, (lower)alkanoylaminophenyl(lower)alkyl, (lower)-alkylphenyl(lower)alkyl, naphthyl, halonaphthyl, (lower)alkoxynaphthyl, phenoxynaphthyl, benzyloxynaphthyl, trifluoromethylnaphthyl, nitronaphthyl, (lower)alkanoylaminonaphthyl, (lower)alkylnaphthyl, 3-indolylmethyl, thienyl and furyl which comprises mixing at least one stoichiometric equivalent of a member selected from the group consisting of 6-aminopenicillanic acid and neutral salts thereof with a compound having the formula

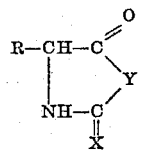

wherein R has the meaning set forth above and wherein X and Y are each members selected from the group consisting of oxygen and sulfur and at least one is oxygen and a tertiary hydrocarbonyl amine in a substantially anhydrous inert solvent below about 40° C. for at least thirty minutes and then recovering said compound.

3. A process for the preparation of a penicillin, said penicillin having the formula

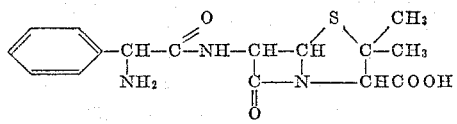

which comprises mixing at least one stoichiometric equivalent of a member selected from the group consisting of 6-aminopenicillanic acid and neutral salts thereof with a compound having the formula

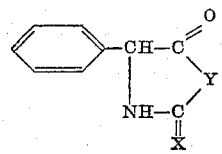

wherein X and Y are each members selected from the group consisting of oxygen and sulfur and at least one is oxygen and a tertiary hydrocarbonyl amine in a substantially anhydrous inert solvent and then recovering said compound.

4. A process for the preparation of a penicillin, said penicillin having the formula

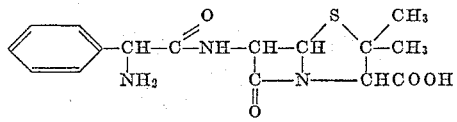

which comprises mixing at least one stoichiometric equivalent of a member selected from the group consisting of 6-aminopenicillanic acid and neutral salts thereof with a compound having the formula

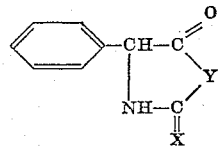

wherein X and Y are each members selected from the group consisting of oxygen and sulfur and at least one is oxygen and a tertiary hydrocarbonyl amine in a substantially anhydrous inert solvent below about 40° C. for at least thirty minutes and then recovering said compound.

5. A process for the preparation of a penicillin, said penicillin having the formula

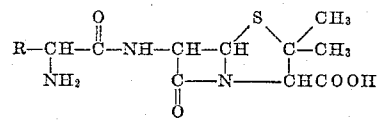

wherein R is (lower)alkyl which comprises mixing at least one stoichiometric equivalent of a member selected from the group consisting of 6-aminopenicillanic acid and neutral salts thereof with a compound having the formula

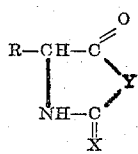

wherein R is (lower)alkyl and wherein X and Y are each members selected from the group consisting of oxygen and sulfur and at least one is oxygen and a tertiary hydrocarbonyl amine in a substantially anhydrous inert solvent below about 40° C. for at least thirty minutes and then recovering said compound.

References Cited in the file of this patent
UNITED STATES PATENTS 2,941,995     Doyle et al. _____ June 21, 1960
2,951,839     Doyle et al. _____ Sept. 6, 1960

OTHER REFERENCES

Wertheim, Textbook of Organic Chemistry, pages 227–228, second edition (1945).